(12) United States Patent  
Eriksson

(10) Patent No.: US 6,336,987 B1  
(45) Date of Patent: Jan. 8, 2002

(54) PROCESS FOR THE MANUFACTURE OF A FLEXIBLE HEAT EXCHANGER

(75) Inventor: Per Gunnar Eriksson, Umea (SE)

(73) Assignee: Texsun Energy A.B., Skellefta (SE)

( * ) Notice: Subject to any disclaimer, the term of this patent is extended or adjusted under 35 U.S.C. 154(b) by 0 days.

(21) Appl. No.: 09/297,074

(22) PCT Filed: Nov. 3, 1997

(86) PCT No.: PCT/SE97/01829

§ 371 Date: Jul. 7, 1999

§ 102(e) Date: Jul. 7, 1999

(87) PCT Pub. No.: WO98/20292

PCT Pub. Date: May 14, 1998

(30) Foreign Application Priority Data

Nov. 4, 1996 (SE) ................................................ 9604020

(51) Int. Cl.[7] .............................. B32B 31/22; F28F 3/14
(52) U.S. Cl. .................... 156/209; 156/219; 156/275.1; 156/290; 156/292; 156/323; 264/263; 264/284; 264/313
(58) Field of Search ................................ 156/292, 209, 156/219, 323, 275.1, 290; 264/263, 284, 293, 313

(56) References Cited

U.S. PATENT DOCUMENTS 4,955,435 A * 9/1990 Shuster et al. .............. 165/170

5,501,757 A * 3/1996 Takagaki .................... 156/209

FOREIGN PATENT DOCUMENTS

| AT | 364 123 | 9/1981 |
| EP | 0 052 321 | 5/1982 |
| FR | 2 361 992 | 3/1978 |
| GB | 2 045 423 | 10/1980 |

* cited by examiner

Primary Examiner—Jeff H. Aftergut  
Assistant Examiner—Todd J. Kilkenny  
(74) Attorney, Agent, or Firm—Oblon, Spivak, McClelland, Maier & Neustadt, P.C.

(57) ABSTRACT

A method of producing a flexible heat-exchange device including a body having a flexible mats and an internal passageway for heat-carrying fluid, an inlet and an outlet, including placing first and second plastic elastic mats in a mould die having supporting surfaces and recesses around the supporting surfaces, separating the first and second plastic elastic mats by a resilient counterdie, bringing the mould dies together with the first and second plastic elastic mats separated by the resilient counterdie into contact wherein the first and second plastic elastic mats are stretched down around abutment surfaces by deformation of the resilient counterdie and around the support surfaces and down into the recesses so as to obtain local plastic deformations as the mould dies are brought together, placing the second plastic elastic mat over the first plastic elastic mat, and mutually joining the first and second plastic elastic mats to form the body.

7 Claims, 6 Drawing Sheets

PROCESS FOR THE MANUFACTURE OF A FLEXIBLE HEAT EXCHANGER

BACKGROUND OF THE INVENTION

1. Field of the Invention

The present invention relates to a method of producing a flexible heat exchanger for absorbing heat from or delivering heat to its surroundings, a device for carrying out the method, a flexible device produced in accordance with the method, and the use of a resilient, plastic mat in the production of said heat exchanger.

2. Discussion of the Background

The heat exchanger may conveniently be used, e.g., as an absorber in a solar energy arrangement, or as a heat exchanging element in a heat exchanging system, or for heating water in desalination processes, or in other applications where a fluid is desired to flow separately from the surroundings for the purpose of absorbing or emitting heat.

The use of flexible rubber material in solar energy absorbing systems has been found more beneficial than the use of rigid materials, such as steel, aluminium, etc. One advantage is that internal deposits or coatings in solid form, e.g. salt, lime or crystalline deposits, can be removed more effectively when cleaning the absorber, since it can be bent and folded during the process, therewith loosening the internal deposits from the walls of the absorber and enabling the deposits to be crushed and readily washed away.

Known flexible absorbers are typically comprised of two pieces of rubber fabric that are placed one upon the other and then mutually joined along their respective edges, normally by vulcanization. The resultant unit is inflated so as to separate the mantle surfaces of the rubber-fabric pieces and hold said pieces apart while a newly heated moulding tool presses the fabric pieces together at those positions where it is wished to join said pieces together, e.g. at positions at which channels will be formed internally of the absorber.

This provides an inexpensive product in comparison with steel or aluminum absorbers. Despite this, however, the actual production of the absorber is nevertheless expensive, due to the relatively long vucanizing or curing times required, among other things.

Leakage problems have also occurred at the inlet and outlet of the absorber, where rigid pipe connectors, normally steel connectors, have been vulcanized firmly to the flexible absorber.

A rubber absorber is also relatively heavy and has a limited useful life, since the rays of the sun which the absorber is intended to capture tend to decompose the rubber.

Metal and rubber absorbers also have a significant material thickness, which shall be heated together with the fluid. A thick material in the absorber walls imparts inertia to the absorber when heating from cold conditions, e.g. after a large cloud has passed.

SUMMARY OF THE INVENTION

Accordingly, an object of the present invention is to overcome these drawbacks and to provide a flexible heat-exchanger that is light in weight, mechanically strong and that can be produced in a rational manner.

This object is achieved with the invention first mentioned above having the characteristic features according to one of the accompanying independent Claims.

Further developments of the invention are set forth in the following dependent Claims.

DESCRIPTION OF PREFERRED EMBODIMENTS

Further features of the invention and advantages afforded thereby will be evident from the following description of a solar energy heating system that includes a flexible heat-exchanging device according to one embodiment of the invention, said embodiment constituting solely an example of the invention and having no limiting effect on the inventive scope. To facilitate an understanding of the text, reference signs have been included in the Figures of the drawings, in which equivalent or similar parts have been identified by the same reference signs.

BRIEF DESCRIPTION OF THE DRAWINGS

FIG. 1 illustrates schematically a number of series-connected absorber panels 1 that form part of a system for solar heating of a fluid medium. The panels are directed towards the sun in a typical manner, at an angle to the horizontal plane appropriate in respect of the current latitude on that particular occasion. The fluid flows through the panels while absorbing thermal energy, causing the temperature of the fluid to rise. This energy is supplied directly by the rays of the sun and by the ambient temperature. The heat is then put to use in other parts of the system (not shown), which parts may include an accumulator tank, a heat exchanger or a direct connection to, e.g., a pool or some other equipment appropriate for the application concerned.

The heating effect achieved with the system is determined essentially by its distance from the sun and the surface area exposed. In the illustrated case, the panels are comprised of module units of standard surface areas and the heating effect of the system can thus be regulated by virtue of the number of panels that are connected in the system.

Figure 2:
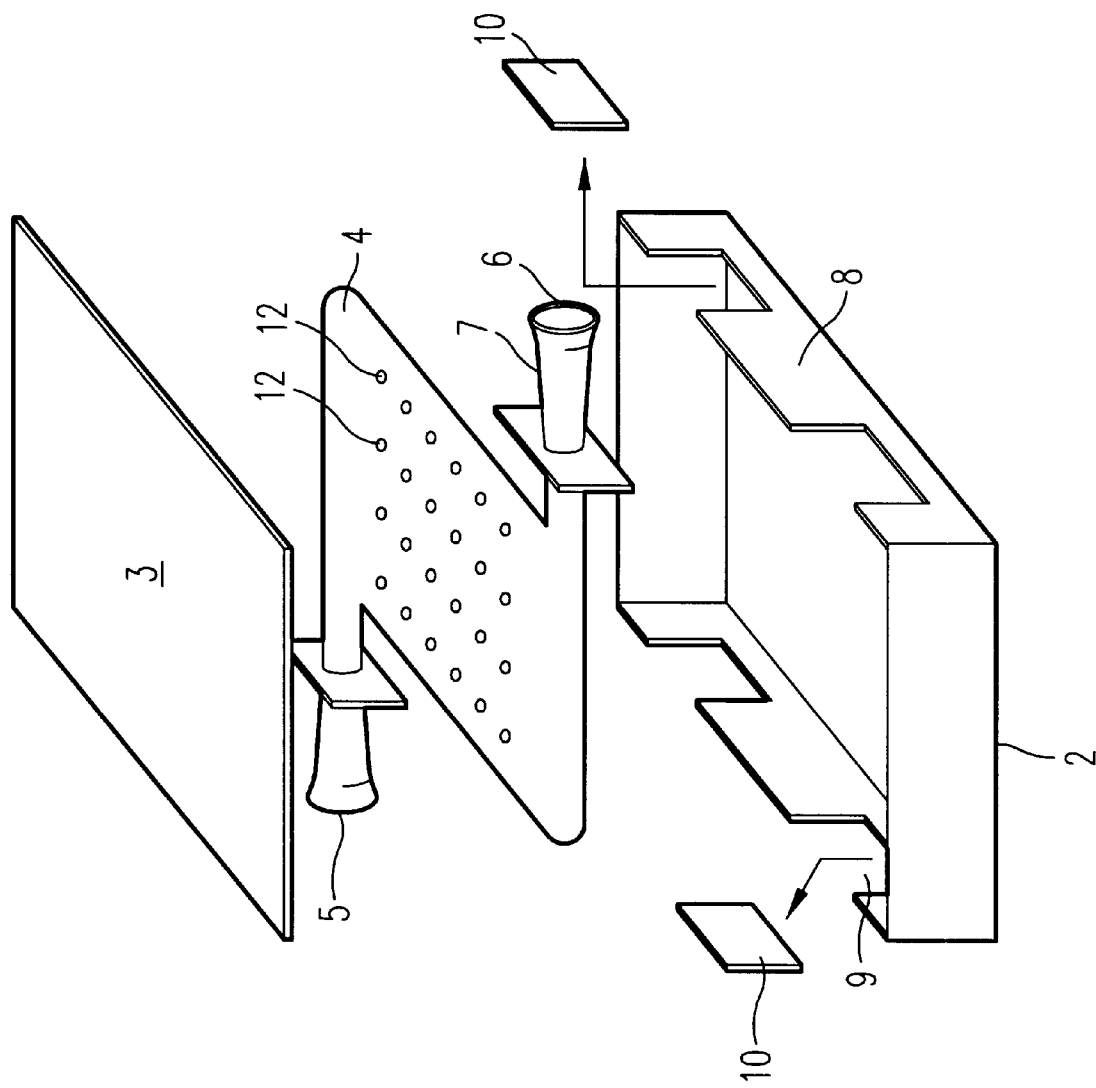
FIG. 2 is a perspective, schematic view showing mutually separated parts of a solar-energy capturing absorber screen.

As will be evident from FIG. 2, a panel may include a supporting box 2 that has a transparent lid 3. Mounted inside the box is a fluid-enclosing device, more specifically a flexible heat-absorbing device 4 hereinafter referred to as the absorber. The heat-carrying fluid transports heat as it flows through the absorber 4, this fluid being water, aqueous mixtures, or some other suitable fluid, for instance.

The absorber has two flow openings, an inlet 5 and an outlet 6, and a flow passageway that extends therebetween. In the case of the illustrated embodiment, the passageway spreads across the full surface of the absorber and therewith also substantially across the whole of the bottom surface of the box.

In the illustrated, preferred embodiment, the inlet 5 and the outlet 6 are disposed in respective diagonally opposite corners of the absorber, and each includes a respective connector device 7. The connector device 7 extends through respective sides of the box, for connection to correspondingly configured connector devices of adjacent absorbers, or to a conduit that connects the absorber to the remainder of the system.

It will be understood that the inlet and outlet may be given positions that are different to those shown, and that several inputs and outputs can be provided in one and the same body 4, in accordance with requirements relating to the application concerned. The design of the connector device may be varied and adapted to current requirements. For instance, the connector device may include coupling or connecting elements that will enable them to be connected to other system components quickly, simply and tightly. They can also include absorber suspension elements in the case of applications in which no box is used, or for fixing or facilitating tightening of the connector device in lead-throughs or transits, for instance.

The box 2 of the illustrated embodiment is rectangular in shape and has two mutually parallel end sides and two slightly longer parallel long sides 8. Each of the long sides 8 includes two through-passing openings for connection of the absorber to the remainder of the system, one opening at each end of respective sides. Normally, only two connection openings are used, and those openings that are not used are closed with the aid of sealing plates 10, which are preferably removable. The four openings that are available enable the user to place the inlet either at one end or the other of the side provided with said openings, by turning the absorber 4 upside down in one and the same box.

Figure 1:
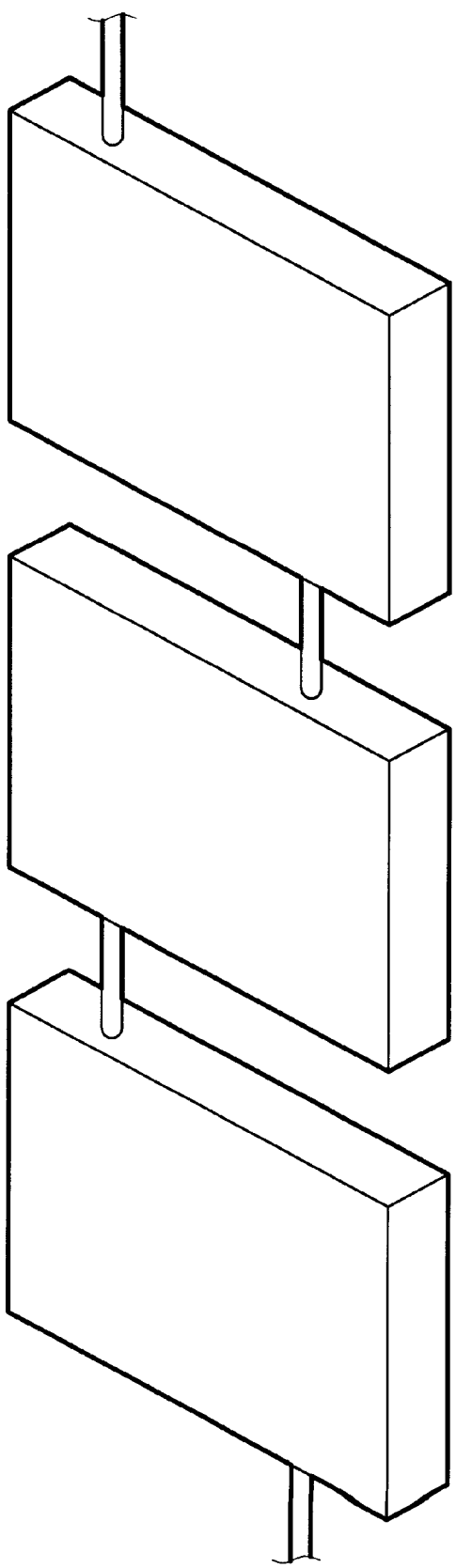
FIG. 1 illustrates part of a solar energy heating system in which an inventive device can be used to advantage.

Turning back to FIG. 1, the series-connected panels of the inventive heat exchanger are connected to the inlet alternately at the top and at the bottom of respective panels, this being possible with standard boxes that have movable cover plates and invertable absorbers. This naturally presumes that the absorbers 4 have the same material properties with respect to resistance to solar exposure, imperviousness, and material stability at both main surfaces, which is the case with the present embodiment.

The lid 3 is preferably comprised of a transparent insulating material. An example of such a lid is a transparent, plastic lid that has mutually separate air passageways or chambers disposed in one or several layers. An insulating lid of this construction will prevent the leakage of heat, for instance in cloudy conditions. A sealing strip will preferably be disposed between the box and the lid with the intention of preventing external water from leaking into the box, for instance rain or condensation. The box will also preferably include a drainage hole for evacuating any moisture that may be present.

Figure 3:
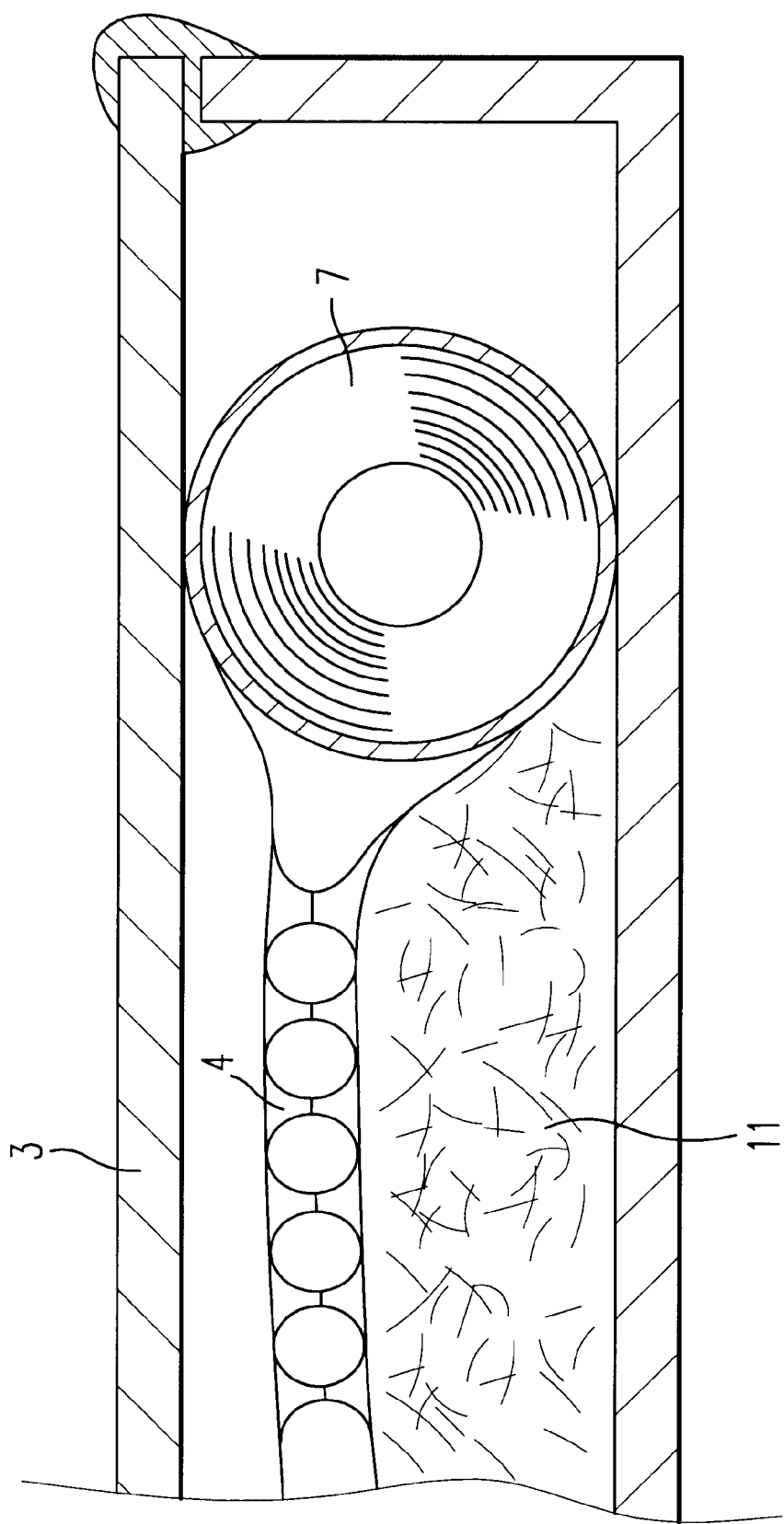
FIG. 3 illustrates in larger scale part of the screen shown in FIG. 2 when mounted.
Figure 4:
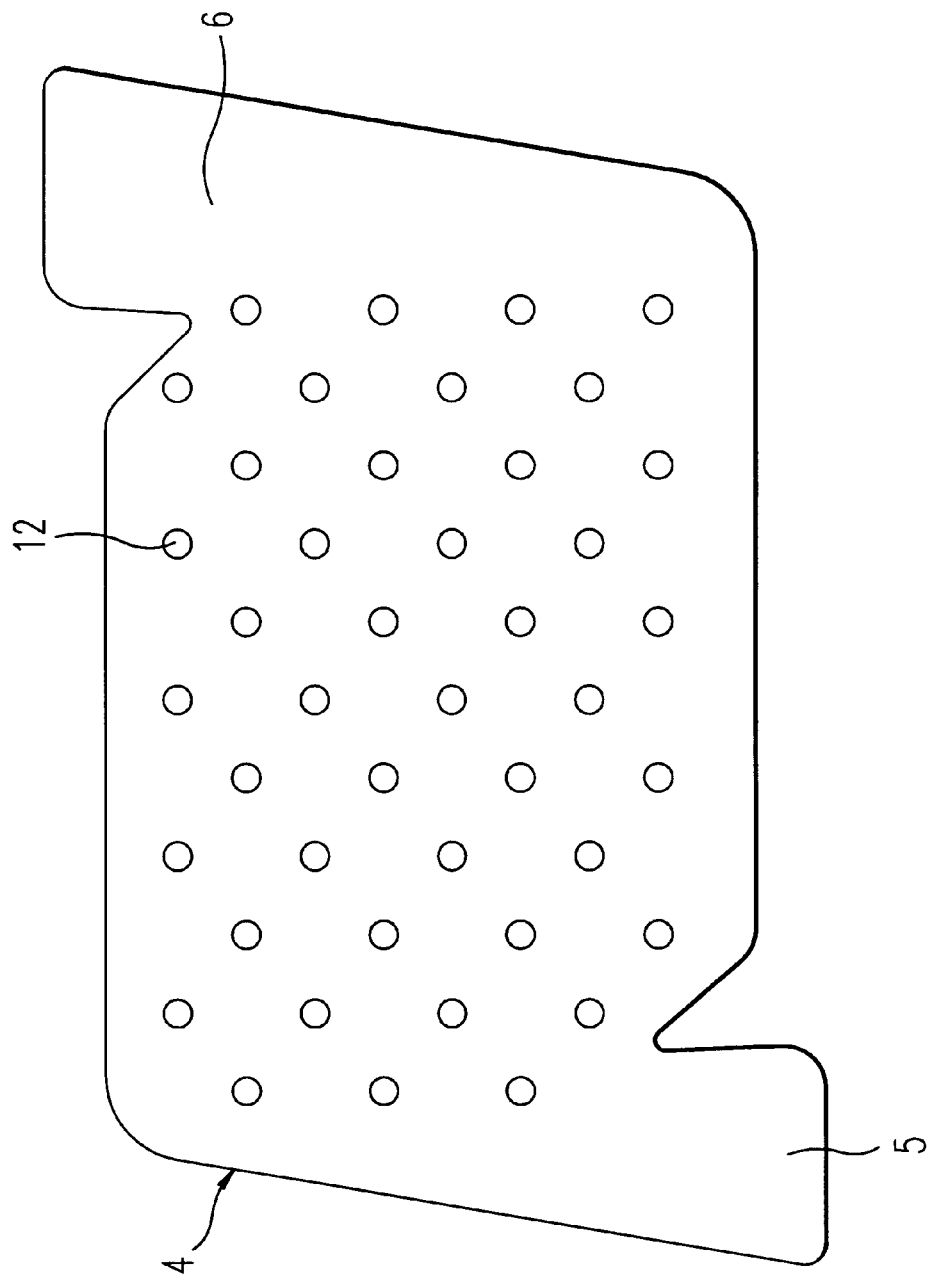
FIG. 4 is a semi-manufacture of a heat exchanging device according to one embodiment of the invention.

In one embodiment, illustrated in FIG. 3, the box is provided over its bottom surface with a bed 11 of insulating material that supports the absorber 4 and counteracts heat losses through the bottom of the box. The insulation may conveniently have the profiled configuration shown in FIG. 3, wherewith the insulation provides support to the absorber body 4 and urges the absorber towards the lid 3 without bringing the body into physical contact the lid. This design enables the gap between lid and absorber to be adjusted. In the illustrated embodiment, the depth of the box is determined by the size of the rigid part of the connector devices 7 that are located in the box, these connector devices being coarser, or larger, than the thickness of the absorber body. In one preferred embodiment, the distance between the lid 3 and the top surface of the absorber is about 6 mm.

In order to achieve a high degree of efficiency, it is desirable to keep the height of the flow passage down and, instead, to spread the water volume over a wide surface area. Trials have shown that a suitable ratio between water volume and surface area in absorbers of the present type is about 1.8 liter per square meter, which corresponds to a water depth of about 1.8 mm. Other water depths are, of course, possible.

In the case of the present embodiment, there has been proposed a pattern in which the flow passage has an outer limitation that coincides with the periphery of the absorber body, and a plurality of spot/dot-like joints 12 on the absorber 4 inwardly of said periphery, these spot/dot-like joints 12 resulting in division and spreading of the water flow. The spot/dot-like joints 12 also prevent bulging of the flow passage in response to pressure increases in the flexible absorber, such bulges otherwise resulting in local increases in volume/surface area ratios and lower efficiencies.

The spot/dot-like joints 12 may have different forms, such as round, oval, dog-leg forms, or constitute straight or curved lines. Round joints are used in the illustrated case.

When producing the heat-exchanging device used here as an absorber, there is used a flexible, resilient plastic mat into which there is pressed, or embossed, a desired flow passageway pattern. The mat is able to retain a given form or configuration after plastic deformation. The mat is flexible, watertight and shape-stable when subjected to normal loads under normal operating conditions, e.g. strong sunlight and high temperatures, both before and after said plastic deformation.

The mat includes at least one thermoplastic polymer sheet, and may also include a mat-strengthening synthetic carrier. The carrier is preferably comprised of synthetic fibres, e.g. woven, knitted, warp knitted or nonwoven fabric. It is then covered with at least one thermoplastic polymer sheet, e.g. a polyurethane sheet. The carrier may be covered on two sides with one or more thermoplastic polymer sheets, of which at least the outermost sheet will conveniently have a dull surface. The carrier is chosen in accordance with the desired load-stretchability required when embossing or depressing the aforesaid pattern.

The carrier used in one embodiment is a woven carrier that is wear and stretch resistant and flexible and pliable. The yarn used in the weave is a polyester, 280 dtex. In order to enclose and effectively contain water, it is necessary to coat a woven carrier in a manner to close the yarn interstices. The carrier of the present embodiment is therefore coated with a two-ply polyurethane covering on both sides. The sheets, or layers, may be applied by passing the carrier through a bath and then adjusting the thickness of the coating sheet by passing the carrier through a gap. Other known methods may also be used.

The mat is embossed or depressed by stretching the mat locally, wherewith the deformation becomes plastic when the mat is correctly dimensioned and will retain the embossed pattern. In the above illustrated example, the carrier may be dimensioned so as to be the component that is plastically deformed and therewith carry the embossed or depressed pattern.

It is necessary to retain the integrity of the sheets or layers when depressing or embossing the device, in spite of the locally acting, pronounced surface elongations.

When the carrier has a coarse stitch, a first sheet or layer may constitute a so-called priming layer that will ensure that the subsequent surface layer will be given a denser and smoother surface, such that the combined layer thickness will be more even across the surface of the mat.

Naturally, it is preferred that a sheet or layer will achieve both adhesion and sealing.

The thermoplastic layer thus provides a sealing function and enables melt-fusion, welding, of the mat, and also contributes towards protecting the carrier against the decomposing effect of the sun rays.

In another embodiment of the invention, the mat may be comprised of a non-reinforced thermoplastic foil.

The inventive method of producing the flexible, heat-exchanging device that is used here as an absorber comprises the steps of pressing into a flexible mat a pattern that corresponds to the extension of a flow passageway, placing a second flexible mat over the depressed or embossed first mat, and joining the mat together so as to form an absorber body 4. The mats may be joined by high frequency, ultrasound, hot air or some other method suitable in respect of the material used, e.g. gluing.

A shape-stable connector device 7 may be provided in the absorber-body inlet 5 and in the absorber-body outlet 6, to facilitate connection to the surrounding system. The mat may also be placed in a mould die that has support surfaces in an abutment plane and recesses or cavities around said surfaces, wherewith the mat will be stretched from the abutment plane and down into the recesses or cavities when subjected to depression forces.

According to one embodiment, two mirror-image, depressed or embossed mats are joined together to form said body 4, wherewith the joints joining said mats are formed by meltfusing together the thermoplastic surfaces of said mats, these surfaces having undergone plastic deformation. A stabler joint is obtained when welding at surface portions that have not been stretched and where the original thickness of the material has been retained.

The two mirror-image, patterned mats may be depressed or embossed simultaneously, e.g. by placing two mats between mirror-image configured mould dies and separating said mats by a resilient counterdie. The mould dies are then brought together so as to move the mats towards one another while separated by the resilient counterdie, wherewith the mats are stretched down around the abutment surfaces by the deformation of the resilient counterdie to an extent such as to cause local plastic pattern-forming deformations to occur in the mats.

The shape precision can be improved in the case of large patterned surfaces, by applying tensile forces to the elastic counterdie transversely to the clamping direction of the mould dies, such as to stretch the resilient counterdie outwards in all directions orthogonally from the axis of the mould-die applying direction.

In accordance with another embodiment, two webs of flexible material are advanced to a pattern-depressing station at which the mirror-image patterns are pressed into the mats. The mats carrying the depressed patterns are then moved to a mat joining station in which the mats are joined together, e.g. by high frequency welding. The resultant mat composite can then be moved to a station in which residual material is removed, e.g. by punching or stamping.

In one alternative embodiment, subsequent to a pattern pressing process, the resilient counterdie can be removed and the embossing dies brought together once again with the mats remaining in their original positions, this time so that the mats will be brought into contact with one another, said mould dies being heated sufficiently for the thermoplastic materials in the mat surfaces to fuse together, for instance by connecting the dies to a high frequency unit, or in some other way.

Figure 5:
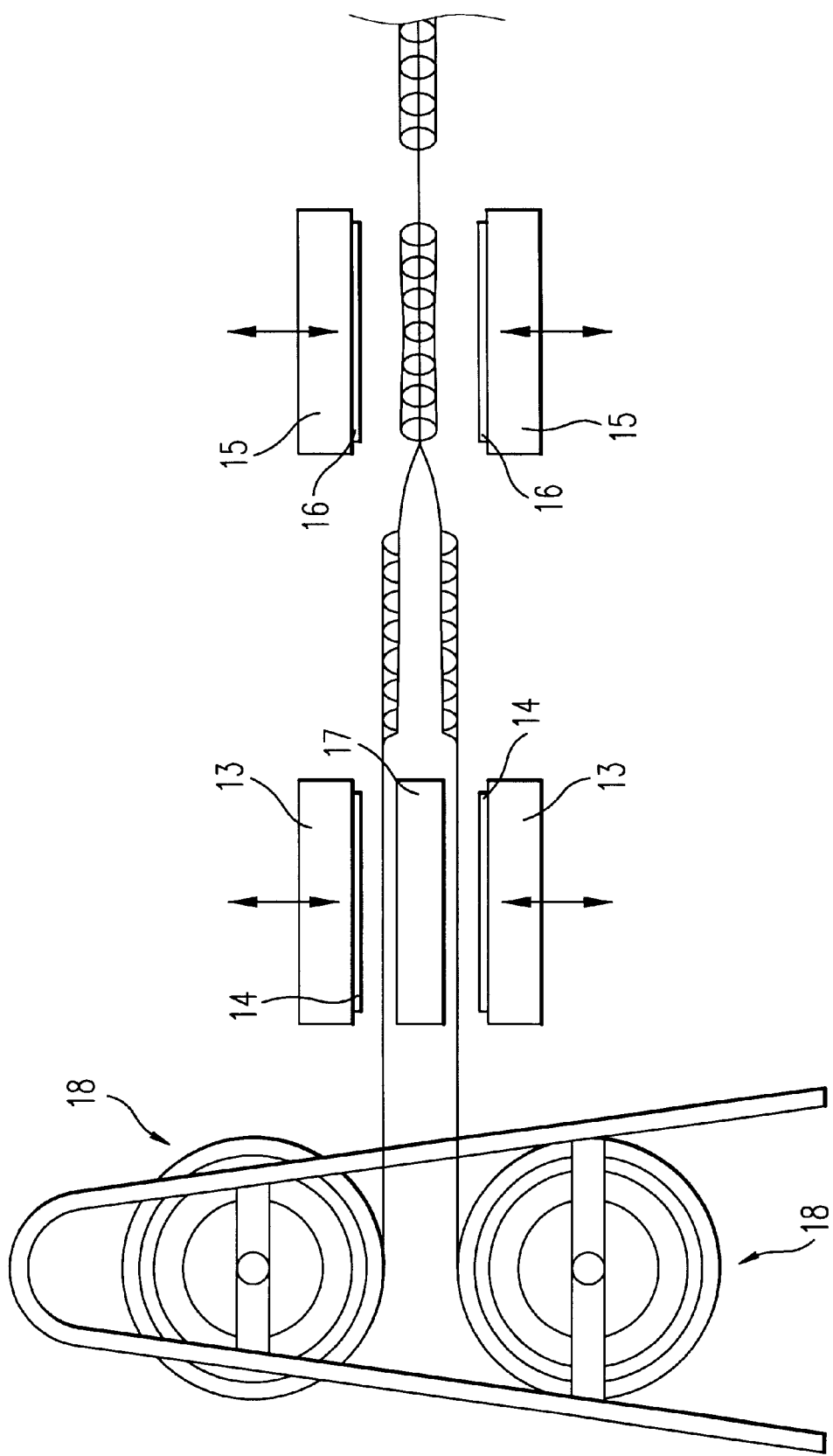
FIG. 5 is a schematic illustration of a production line constructed to carry out the method.

FIG. 5 is a schematic illustration of one embodiment of a device that can be used to carry out the method. This device includes two mould dies 13 which can be brought into contact with one another and which present on their mutually opposing surfaces a generally mirror-image pattern in the form of recesses provided in the die abutment surfaces 14, these recesses corresponding to the extension of a desired flow passageway. The device also includes two joining tools 15 which can be brought into contact with one another and which present on their mutually opposing surfaces generally mirror-imaged patterns in the form of abutment surfaces 16 that form the electrodes of the joining tools. The electrodes are disposed in a pattern that corresponds to the delimitations of the flow passageway and that can be connected to a high frequency unit. A resilient counterdie 17 having generally parallel main surfaces can be swung-in between the mould dies 13, or removably arranged therebetween. The resilient counterdie 17 may be placed in a frame while applying tensile forces in all directions transversely to the direction in which the dies 13 are brought together.

The apparatus may also include a punch for punching-out the welded device. A punching tool may also be provided for punching-out a blank upstream of or downstream of the mould, therewith enabling shape-standard blanks, preferably provided with guide means in the form of guide holes, for instance, to be placed in the mould and/or the joining tool.

A production line may include two reels 18 of mat material upstream of the mould dies, and means may be provided for advancing the mats in between the mould dies 13 in a mat embossing position, and for moving the embossed mats into position between the mat-joining tools 15. The production line may also include means for advancing the mat composite to a station that includes a punching or stamping tool or like means, for final trimming of the device/absorber.

The moulding tool and the mat joining tool may also be comprised in one and the same tool, wherewith the tool abutment surfaces can be connected controllably to a high frequency unit and the resilient counterdie capable of being swung in between the mould dies when embossing the mats. The counterdie is swung away from the mats, when joining the mats together.

The mould tool will preferably be heated to an elevated temperature in the embossing process. This can be achieved by passing steam through channels in the mould dies, or by providing the mould dies with electric heating elements.

The apparatus may also include a positioning tool for positioning a holder means between the mats in the proximity of the inlet and outlet of the device, prior to joining the mats together. This positioning means can be connected to the high frequency unit, wherewith the connector device/devices can be welded firmly to the mats at the same time as the mats are joined together. This enables a flexible heat-exchanging device to be produced in a highly rational manner.

Figure 6:
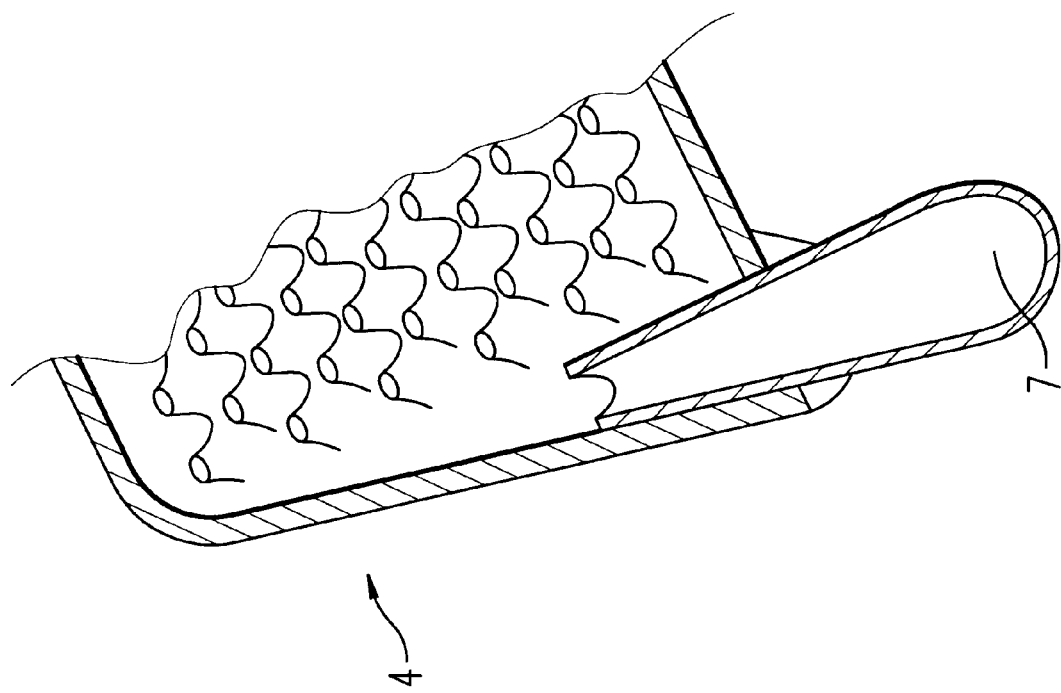
FIG. 6 is a sectional view of a heat-exchanger according to one embodiment of the invention.

FIG. 6 is a schematic illustration of part of an absorber 4 produced in accordance with the method last described. The illustrated absorber has been cut along the joints, and the connector device 7 has also been cut up in the same plane. The connector device 7 is shown in the form of a slightly conical, rigid tube, e.g., a thermoplastic tube, that has been joined to the mat by means of a high frequency welding process.

The free end of the connector device 7 may be provided with any type of coupling element suitable for further connection. In one embodiment, the free end of the connector device includes a collared part which is intended to be received by a similar collared part on an adjacent device or conduit, these collared parts having crimped on their inner surface a V-shaped circumferentially exceeding groove, and preferably a packing located between their mutually opposing surfaces. The advantage with this embodiment is that the connections require very little space and therefore enable the solar collector panels to be placed very close together.

What is claimed is:

1. A method of producing a flexible heat-exchange device including a body having a mutually joined plurality of flexible mats and an internal passageway for a heat-carrying fluid, an inlet and an outlet, comprising the steps of:

placing a first plastic elastic mat and a second plastic elastic mat in a mould die having supporting surfaces and recesses around said supporting surfaces, respectively;

separating the first and second plastic elastic mats by a resilient counterdie;

bringing the mould dies together with the first and second plastic elastic mats separated by said resilient counterdie into contact with one another wherein the first and second plastic elastic mats are stretched down around abutment surfaces by deformation of the resilient counterdie and around the support surfaces and down into said recesses so as to obtain local plastic deformations as the mould dies are brought together;

placing the second plastic elastic mat over the first plastic elastic mat; and mutually joining said first and second plastic elastic mats to form said body.

2. A method according to claim 1, wherein:

the first and second plastic elastic mats comprise two mirror-image patterns having local plastic deformations formed by embossing or depressing, and are joined together to form said body; and a plurality of joints is formed at portions of the first and second plastic elastic mats by the plastic deformations.

3. A method according to claim 2, wherein the bringing step comprises at least one of depressing and embossing the first and second plastic elastic mats into two mirror-image patterned mats simultaneously.

4. A method according to claim 1, wherein the bringing step comprises applying tensile forces to the resilient counterdie transversely to clamping movement direction of the mould dies to stretch the resilient counterdie outwardly in all directions orthogonally to an application axis of the mould dies.

5. A method according to claim 1, further comprising joining edges of said first and second plastic elastic mats and effecting internal pattern-producing joints in one same process.

6. A method according to claim 2, further comprising the steps of:

advancing two webs of flexible material to a pattern depressing station;

depressing the two mirror-image patterns in the first and second plastic elastic mats;

advancing the first and second plastic elastic mats thus patterned to a mat joining station; and joining the first and second plastic elastic mats together.

7. A method according to claim 2, further comprising the steps of:

removing the resilient counterdie after said local plastic deformations formed by embossing or depressing;

bringing the two mirror-image dies together; and connecting the two mirror-image dies to a high frequency welding unit and welding the first and second plastic elastic mats together.

* * * * *

UNITED STATES PATENT AND TRADEMARK OFFICE
CERTIFICATE OF CORRECTION

PATENT NO.      : 6,336,987 B1                                            Page 1 of 1
DATED           : January 8, 2002
INVENTOR(S)     : Eriksson It is certified that error appears in the above-identified patent and that said Letters Patent is hereby corrected as shown below:

<u>Title page, Item [54] and Column 1, lines 1&2,</u>
The title should read:

-- DEVICE AND PROCESS FOR THE MANUFACTURE OF A FLEXIBLE HEAT EXCHANGER --

Signed and Sealed this

Eleventh Day of February, 2003

JAMES E. ROGAN
*Director of the United States Patent and Trademark Office*